3,732,338
MIXTURES OF ETHYLENE-PROPYLENE
RUBBERS AND POLYPENTENAMERS
Dieter Theisen, Remscheid, Friedrich Haas, Cologne, and
Manfred Beck, Odenthal-Globusch, Germany, assignors
to Bayer Aktiengesellschaft
No Drawing. Filed Dec. 20, 1971, Ser. No. 210,163
Claims priority, application Germany, Dec. 24, 1970,
P 20 63 716.5
Int. Cl. C08f 29/12
U.S. Cl. 260—897    11 Claims

ABSTRACT OF THE DISCLOSURE

Rubber mixtures of
(a) 5–95% by weight of ethylene-propylene rubber and
(b) 95–5% by weight of polypentenamer.

---

This invention relates to mixtures of 5 to 95% by weight of ethylene-propylene rubber and 95 to 5% by weight of polypentenamer-rubber.

The preferred mixtures consist of 50 to 95% by weight of ethylene-propylene rubber and 5 to 50% by weight of polypentenamer-rubber.

Ethylene-propylene rubbers within the meaning of this invention are copolymers of ethylene and propylene composed of about 20 to 80% by weight of ethylene and 80 to 20% by weight of propylene and which have rubber-like properties. The copolymers are preferably composed of 40 to 70% by weight of ethylene and 60 to 30% by weight of propylene. Terpolymers of ethylene, propylene and a third cyclic or open-chain hydrocarbon which contains at least two (preferably non-conjugated) C=C double bonds are also regarded as ethylene-propylene rubbers. The last mentioned termonomer may be incorporated in the polymer in quantities of up to 15% by weight based on the total weight of monomers. Especially suitable tercomponents are hexa-1,4-diene, ethylidine-norbornene, methylidene-norbornene, tetrahydroindene, dicyclopentadiene, 2-methyl-pentadiene-(1,4), cycloheptadiene-(1,4), cyclooctadiene-(1,5), bicyclo-(3,2,0)-heptadiene-(2,6), 1,2-divinyl cyclobutane, 1,2,4-trivinyl cyclohexane, 2-butene-2-yl-norbornene-5 and decatriene-(1,4,9). Ethylene-propylene rubbers are known compounds. They have been described e.g. in "Polymer Chemistry of Synthetic Elastomers" Part II, published by J. P. Kennedy and E. Törnqvist, Interscience Publishers, New York, 1969, pages 679 to 702. Ethylene-propylene rubbers are chemically very inert owing to their low double bond content but they are almost impossible to use for technological purposes, especially for the construction of tyres, because they have too little building tack. Attempts have already been made to overcome this defect by the addition of resins as adhesifying agents but the effect of these substances is only slight and, moreover, is connected with deterioration in the properties of the vulcanisate.

According to the invention it has now been found that mixtures of ethylene-propylene rubbers and polypentenamer have excellent building tack and at the same time most of the advantageous properties of ethylene-propylene rubbers.

Polypentenamer-rubbers may be prepared by ring opening polymerisation of cyclopentene with organometallic catalysts, e.g. according to German Pat. No. 1,299,868. For this invention it is especially suitable to use a polypentenamer with rubber-like properties which has more than 30% of its double bonds in the trans-configuration. The range of 50 to 99% trans-configuration is especially advantageous if the trans double bonds are arranged in blocks in the polymer. If the distribution of trans double bonds is statistical (random), then the preferred range of trans double bond content is 70 to 99%. (By density measurements according to DIN 1,306 or 53,550 it can be determined whether a polymer which has been rendered amorphous by chilling is in the form of a block polymer or a random polymer).

The mixtures of ethylene-propylene rubbers and polypentenamers according to the invention contain 5 to 95% by weight of ethylene-propylene rubber and 95 to 5% by weight of polypentenamer. Mixtures which contain 50 to 95% by weight of ethylene-propylene rubber and 5 to 50% by weight of polypentenamer are particularly preferred.

Such mixtures have excellent building tack and green strength, the properties of the ethylene-propylene rubber are substantially preserved, and the mixtures are completely homogeneous, can take up very large quantities of fillers and can easily be co-vulcanised.

The building tack of the mixtures is considerably higher than the arithmetic mean of the building tacks of the pure rubbers of which the mixtures are composed. The same applies to the green strength of the mixture.

Especially advantageous results are obtained if the Mooney viscosities [ML–4′ (100° C.)] of the rubbers which are to be mixed do not differ greatly from each other. It is therefore preferred to choose a polypentenamer which has a Mooney viscosity of 50 to 150, preferably about 70 to 140, and an ethylene-propylene rubber which has a viscosity in about the same range.

Mixing of the two rubbers may be carried out by the usual methods. They may be mixed together on a roller or in an internal mixer or the solution of the two rubbers in organic solvents obtained from the polymerisation process may be mixed and then precipitated together by the usual methods. Particularly, thorough mixing is obtained by this method. The usual quantities of rubber extending oils may be added to the rubber mixture by the usual methods.

The rubber mixtures obtained can be vulcanised in the usual manner. They are suitable for producing any shaped article, e.g. automobile tires, rubber hose.

In the following examples, parts are parts by weight and percent are percent by weight unless otherwise indicated.

EXAMPLE 1

Mixtures were prepared on a rolling mill from an ethylene-propylene copolymer which had a propylene content of 60% and a Mooney viscosity of ML–4′ (100° C.) of 70 and a transpolypentenamer which contained 92% of trans bonds and which had a Mooney viscosity ML–4′ (100° C.) of 110. The formulations of the mixtures were as follows:

Formulation I:                                       Parts
   Ethylene-propylene copolymer _____ 100–50
   Polypentenamer _____ 0–50
   Carbon black N–660 (ASTM) _____ 30
   Zinc oxide _____ 3
   Phenyl-α-naphthylamine _____ 1.5

Formulation II:
   Ethylene-propylene copolymer _____ 100–50
   Polypentenamer _____ 0–50
   Carbon black N–330 (ASTM) _____ 75
   Aromatic rubber extender oil _____ 45
   Zinc oxide _____ 1
   Phenyl-α-naphthylamine _____ 1
   N-phenyl-N′-i-propyl-phenylenediamine ___ 1

The mixtures are made up into strips measuring 6.2 mm. in width, 50 mm. in length and 1.5 mm. in thickness and the strips are applied to a fabric which has been treated with a finish which renders it receptive to rubber, and the strip applied to the fabric is then covered with an aluminum foil and pressed at 110° C. for 3 minutes. A completely smooth surface is obtained.

After removal of the foil, two such strips are pressed together over an area of contact of 38.44 mm.² and kept under a pressure of 2.25 kg./cm.² (=application of a weight of 16 oz.) for 10 seconds. The area of contact is then put under traction and stripped at the rate of 0.46 mm./sec. The force in grams opposing the traction is determined and characterised as the "bond strength."

The tests were carried out on a Tel-Tak TM 1969 test apparatus of Monsanto.

The green strength is expressed in terms of the tensile strength of the crude mixture in kg. wt./cm². according to DIN 53,504.

The results are summarised in the table below.

TABLE I

| Trans-polypentenamer, percent | 100 | | 10 | 20 | 30 | 40 | 50 |
|---|---|---|---|---|---|---|---|
| Ethylene-propylene copolymer, percent | | 100 | 90 | 80 | 70 | 60 | 50 |
| "Bond-strength" formulation I(g.) | 2,190 | 250 | 870 | 1,050 | 1,230 | 1,360 | 1,450 |
| "Bond.strength" formulation II (g.) | 2,040 | 480 | 900 | 1,020 | 1,190 | 1,250 | 1,310 |
| "Green-strength" formulation I (kg./cm.²) | 22 | 4.8 | 7.2 | 9.8 | 13.2 | 15.8 | 17.4 |

EXAMPLE 2

Mixtures were prepared from an ethylene-propylene-terpolymer having a propylene content of 40% and containing dicyclopentadiene as tercomponent in a quantity corresponding to 10 C=C double bonds per 1000 carbon atoms by the method described in Example 1. Mooney viscosity ML–4' (100° C.=70 and the trans-polypentenamer of Example 1. The results are shown in Table II.

TABLE II

| Trans-polypentenamer, percent | 100 | | 10 | 20 | 30 | 40 | 50 |
|---|---|---|---|---|---|---|---|
| Ethylene-propylenel-terpolymer, percent | | 100 | 90 | 80 | 70 | 60 | 50 |
| "Bond-strength" formulation I (g.) | 2,190 | 320 | 940 | 1,290 | 1,510 | 1,620 | 1,730 |
| "Bond-strength" formulation II (g.) | 2,040 | 380 | 910 | 1,030 | 1,190 | 1,250 | 1,300 |
| "Green-strength" formulation II (kg./cm.²) | 24 | 4.2 | 8.1 | 10.2 | 14.7 | 16.3 | 19.2 |

EXAMPLE 3

Example 1 is repeated with an ethylene-propylene-terpolymer containing 46% of propylene and ethylidine-norbornene in a quantity corresponding to 8 C=C bonds per 1000 carbon atoms as tercomponent and having a Mooney viscosity ML–4' (100° C.) of 65. The values found for the bond strength and green strength of the mixtures obtained from Formulations I and II agreed with those in Table II.

EXAMPLE 4

Example 1 is repeated with an ethylene-propylene-terpolymer having a propylene content of 42% and containing ethylidene-norbornene in a quantity corresponding to 15 C=C double bonds per 1000 C-atoms as tercomponents and having a Mooney viscosity ML–4' (100° C.) of 90. The values found for the bond strength and green strength of the mixtures obtained from Formulations I and II were the same as in Table II.

We claim:
1. A rubber composition comprising
   (a) 5 to 95% by weight of ethylene-propylene rubber and
   (b) 95 to 5% by weight of polypentenamer-rubber.

2. A mixture as claimed in claim 1 which comprises 50 to 95% of component (a) and 50 to 5% of component (b).

3. A mixture as claimed in claim 1 in which the ethylene propylene rubber comprises 20 to 80% by weight ethylene and 80 to 20% by weight propylene.

4. A mixture as claimed in claim 1 in which the ethylene propylene rubber also comprises up to 15% by weight of a termonomer, which is a cyclic or open chain hydrocarbon containing at least two carbon-carbon double bonds.

5. A mixture as claimed in claim 4 in which the termonomer is hexa-1,4-diene, ethylidene-norbornene, methylidene-norbornene, tetrahydroindene, dicyclopentadiene, 2-methylpentadiene-1,4, cycloheptadiene-1,4, cyclooctadiene-1,5, dicyclo-(3,2,0)-heptadiene-2,6, 1,2-divinyl cyclobutane, 1,2,4 - trivinyl cyclohexane, 2 - buten - 2 - yl-norbornene-5- or decatriene-1,4,9.

6. A mixture as claimed in claim 1 in which the polypentenamer comprises more than 30% of the double bonds in the trans configuration.

7. A mixture as claimed in claim 6 in which the polypentenamer comprises 50 to 90% of trans double bonds.

8. A mixture as claimed in claim 7 in which the trans double bonds are arranged in blocks.

9. A mixture as claimed in claim 6 in which the polypentenamer comprises 70 to 99% trans double bonds which are randomly distributed.

10. A mixture as claimed in claim 1 in which the components (a) and (b) have substantially similar Mooney viscosities.

11. A rubber composition comprising a mixture as claimed in claim 1 and an extending oil.

References Cited

UNITED STATES PATENTS

| 3,523,145 | 8/1970 | Manaresi et al. | 260—886 |
| 3,458,489 | 7/1969 | Natta et al. | 260—93.1 |
| 3,383,349 | 5/1968 | Grasley | 260—28.5 |

SAMUEL H. BLECH, Primary Examiner

C. J. SECCURO, Assistant Examiner

US. Cl. X.R.

260—41 R, 41 B, 93.1, 897 R